United States Patent
Rosencher et al.

(10) Patent No.: US 6,236,045 B1
(45) Date of Patent: May 22, 2001

(54) INFRARED QUANTUM STRUCTURE IMAGING DEVICE WORKING AT AMBIENT TEMPERATURE

(75) Inventors: Emmanuel Rosencher, Bagneux; François Micheron, Gif sur Yvette, both of (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/218,154

(22) Filed: Dec. 22, 1998

(30) Foreign Application Priority Data

Dec. 23, 1997  (FR) .................................................. 97 16339

(51) Int. Cl.$^7$ .............................................. H01L 31/0328
(52) U.S. Cl. ........................ 250/330; 250/203.5; 250/352
(58) Field of Search ................................ 250/330, 203.5, 250/352

(56) References Cited

U.S. PATENT DOCUMENTS

| | | |
|---|---|---|
| 4,349,838 | * 9/1982 | Daniel ................................ 250/203.5 |
| 5,086,327 | 2/1992 | Rosencher et al. . |
| 5,228,777 | 7/1993 | Rosencher et al. . |
| 5,326,984 | 7/1994 | Rosencher et al. . |
| 5,506,418 | 4/1996 | Bois et al. . |
| 5,650,636 | 7/1997 | Takemura et al. . |
| 5,726,500 | 3/1998 | Duboz et al. . |
| 5,869,844 | 2/1999 | Rosencher et al. . |
| 5,969,375 | * 10/1999 | Rosencher et al. ............... 257/21 |

FOREIGN PATENT DOCUMENTS 0 443 284 A3   8/1991   (EP) .
2 239 555      7/1991   (GB) .

\* cited by examiner

*Primary Examiner*—Constantine Hannaher
*Assistant Examiner*—Otilia Gabor
(74) *Attorney, Agent, or Firm*—Oblon, Spivak, McClelland, Maier & Neustadt, P.C.

(57) ABSTRACT

An infrared imaging device including a quantum device positioned and configured to detect infrared transmission at ambient temperature, a cooler thermally coupled to the quantum device, and controller for controlling the cooler based on a function of plural image-taking parameters as a command.

18 Claims, 4 Drawing Sheets

INFRARED QUANTUM STRUCTURE IMAGING DEVICE WORKING AT AMBIENT TEMPERATURE

BACKGROUND OF THE INVENTION

The invention relates to an infrared quantum structure imaging device or imaging device working at ambient temperature.

The field of the invention relates to the detection of infrared transmissions. Chiefly, two detection mechanisms are used at the present time:

- heat sensors which use the variations of a physical parameter (resistivity, capacity, etc.) with the heating due to the absorption of the infrared wave;
- quantum sensors which use the transition between two series of quantum levels separated by a forbidden energy gap.

The quantum sensors are particularly valuable because their ultimate performance in terms of detectivity is far greater than that of heat sensors. Thus the values of detectivity of $3\times10^{11}$ cm/Hz$^{1/2}$ W are obtained in the II band (between 3 and 5 $\mu$m) with sensors based on semiconductors such as HgCdTe or PbSnTe. These results are more than 20 times higher than those obtained with heat sensors. However, unlike heat sensors, these quantum sensors suffer from the fact that they have to be cooled to be able to work. Typically, they work at temperatures in the range of 80 K.

The French patent application No. 96 15738 describes a quantum sensor working at ambient temperature or close to ambient temperature (250–300 K). This sensor has resonant coupling arrays that increase the values of detectivity of quantum sensors. FIG. 2 shows the noise equivalent temperature detectable values (NETD) that can be obtained in an optimized structure based on a heterostructure of InAs$_{0.95}$Sb$_{0.15}$ (0.1 $\mu$m)/GaSb with a surface area of 40×40 $\mu$m$^2$, for a 20 Hz passband and different non-radiative lifetimes in the material.

It can be seen that the performance characteristics of the sensor depend considerably on the temperature. Thus, for a lifetime of 30 ns of the photocarriers, the NETD goes from 40 mK to 5 mK when the temperature goes from 300 to 150 K.

A sensor of this kind does not require any cooling in order to function. However, it may be necessary to improve the performance characteristics and especially to reduce the NETD.

SUMMARY OF THE INVENTION

The invention therefore provides for a quantum structure imaging device working at ambient temperature comprising a cooler thermally coupled to the quantum imaging device and means to control the cooler receiving a command as a function of image-taking parameters such as the contrast of the scene viewed by the sensor, the aperture of the optical system, etc.

The invention provides for the checking of the performance characteristics of the imaging device by means of a control of temperature close to the ambient temperature. It is therefore applicable in an infrared camera system whose performance characteristics can be controlled according to the conditions of use. The matrix of quantum sensors with coupling network is fixedly joined to a Peltier cooling element, the assembly being included in a camera with an input optical system.

BRIEF DESCRIPTION OF THE DRAWINGS

The various objects and features of the invention shall appear more clear from the following description and from the appended figures, of which.

MORE DETAILED DESCRIPTION

Figure 1:
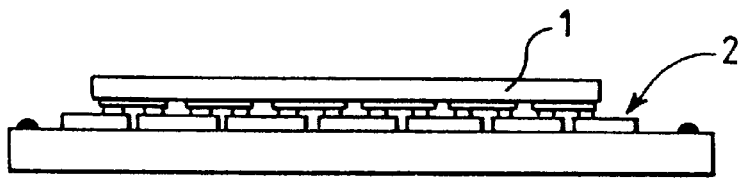
FIG. 1 shows an exemplary embodiment of an imaging device according to the invention.

FIG. 1 shows an exemplary embodiment of the imaging device according to the invention. The detection device 1 is a matrix of quantum sensors with a design that is known in the prior art. As described in the French patent application No. 96 15738, the layer of InAsSb has, for example, a thickness of 0.1 $\mu$m and the layers AlAsSb have a thickness of 10 nm. Associated with the face of the detection device 1 (the face opposite the light receiving face) a cooling device is thermally coupled According to the invention, the detection device 1 works at ambient temperature or almost ambient temperature and the performance characteristics of the sensor are considerably increased when it is cooled. The object of the cooler therefore is not to enable its operation as is the case for example with sensors that do not work at ambient temperature (HgCdTe sensors for example) but to improve its performance characteristics in certain cases of use.

Figure 2:
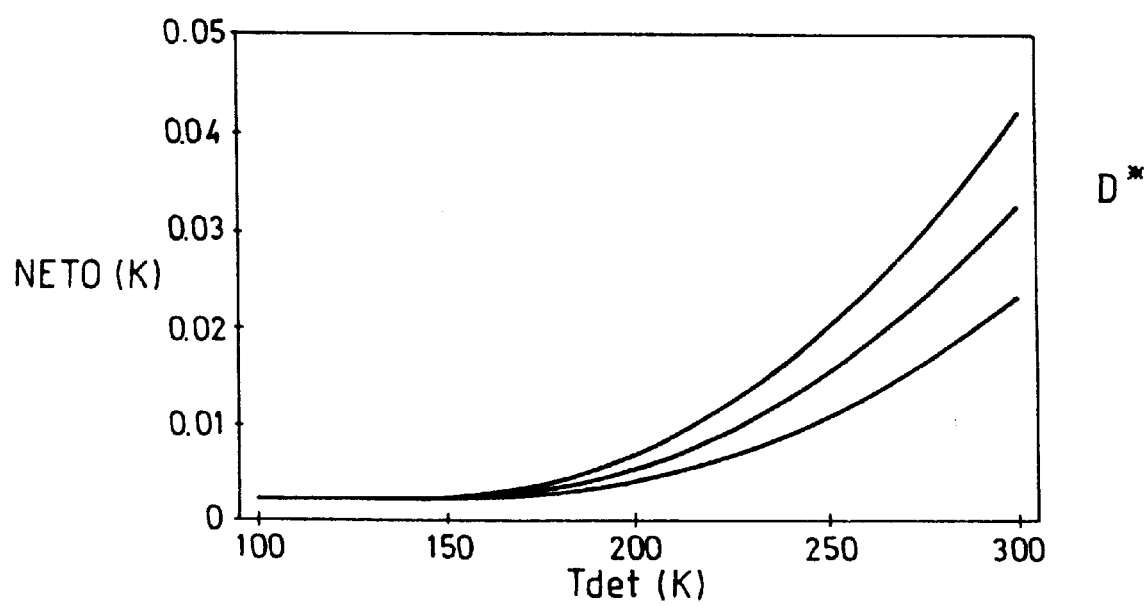
FIG. 2 shows curves of detectivity of a sensor made of InAsSb.

Indeed, by way of an example, the detection device has a noise equivalent temperature detectable (NETD) curve as a function of temperature which is of the type shown in FIG. 2.

At ambient temperature and under acceptable conditions of visibility, the detection performances are sufficient without having to cool the sensor.

By contrast, under less efficient conditions of reception and with poor meteorological conditions (snow or rain), the contrast will be less efficient and the user could, with the system of the invention, reduce the temperature of use and therefore improve the detection performance characteristics.

By applying the invention to a camera, the computations show that the NETD is represented by the relationship:

$$NETD = \frac{S_d^{1/2} \Delta f^{1/2}}{(IFOV)^2 S_o \tau_o \tau_a D^*(T) \int_{\lambda_1}^{\lambda_2} (\partial R / \partial T) d\lambda}$$

where:

Sd: surface area of sensor;

$\Delta$f: sensor + amplifier electrical passband, inversely proportional to the integration time of the sensor, hence proportional to the image rate F;

IFOV: instantaneous field of view, inversely proportional to the aperture number;

N: optical diameter/focal length of optical system;

So: input optical system surface area;

$\tau_o$: transmission of the optical system;

$\tau_a$: transmission of the atmosphere;

D*(T): detectivity in the IR$\lambda_1$–$\lambda_2$ band, as a function of the temperature T;

T: temperature of the sensor;

R: infrared radiance.

It can be clearly seen in this relationship that any variation of one of the parameters defining the NETD may be compensated for by a variation of D*, hence of T, to keep NETD constant.

Figure 3:
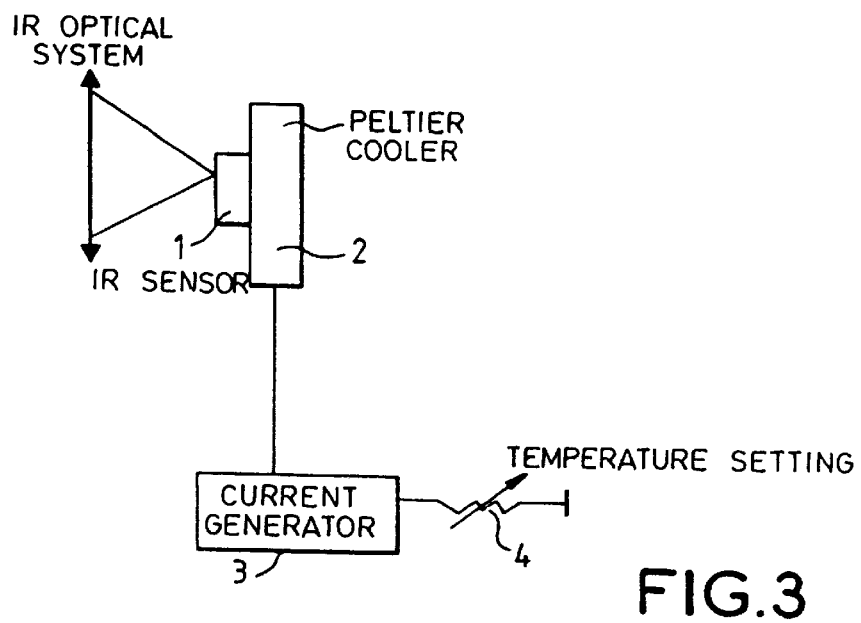
FIG. 3 shows a system for the manual control of the cooler of the imaging device.

FIG. 3 shows a manual control system enabling the sensor to be made to work at different temperatures.

According to a preferred embodiment of the invention, the cooler 2 is a Peltier effect cooler. The control system of the cooler comprises a current generator. Series-connected with the current generator, there is provided a manual control variable resistor for example of the potentiometer type. Consequently, any variation of the resistance implies a variation of the current delivered by the current generator and hence a variation in the cooling efficiency of the Peltier effect cooler.

It is quite clear that the manual control may be provided with an electronic circuit enabling a digital type control.

In this mode, the user himself sets the temperature, hence the performance characteristics of the camera, as a function of the situation (temperature of the camera, contrast of the scene, use of filters, change of aperture of the optical system, passage from a detection mode to an identification mode, etc.).

Figure 4:
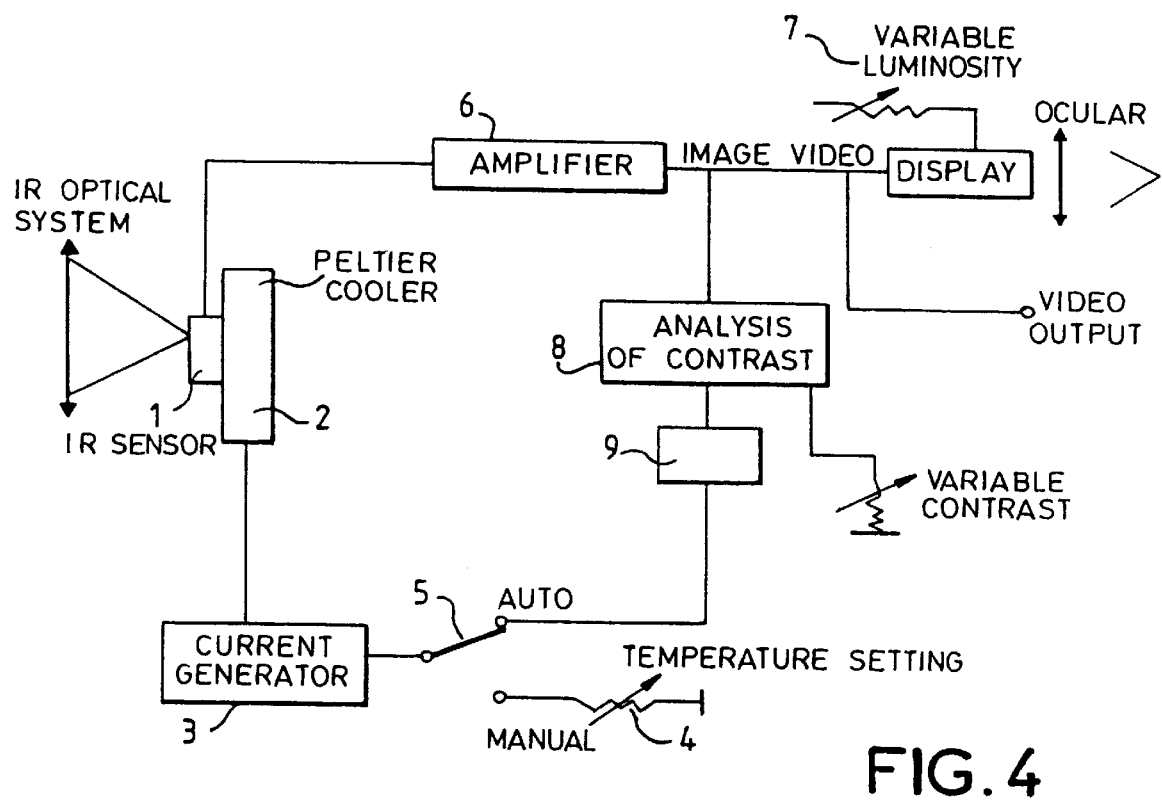
FIG. 4 shows a system for the automatic control of the cooler of the imaging device.

FIG. 4 shows a system for the automatic control of the cooler.

This system comprises an amplifier 6 connected to a sensor 1. This amplifier may be that of the camera and it may be used to display the detected image on a display device. A contrast analysis circuit 8 receives the detection image given by the amplifier. Depending on the contrast detected, the contrast analyzer 8 enables greater or smaller circulation of the current given by the generator. For example, depending on the detected level of contrast, the analyzer 8 gives an appropriate control signal to the circuit 9 which introduces a corresponding resistance into the circuit of the current generator 3.

In this mode, the contrast variations of the image formed by the imaging device are therefore automatically compensated for by a circuit for controlling the current of the Peltier element which adjusts the temperature of the sensor. The contrast of the image, as well as the luminosity of the display screen are independently adjustable as indicated in the drawing of FIG. 4.

FIG. 4 also shows a manual control circuit. A selector switch 5 enables the automatic command of the Peltier cooler (position of the selector switch 5 in FIG. 4) to be switched over to the manual control position.

This circuit thus enables a passage from a standby mode (manual position) with average quality reception, but enabling detection, to an identification mode (automatic position) enabling an identification of a detected object.

The system of the invention therefore, when it is in a position of automatic operation, enables:

1—A compensation for a low thermal contrast ("washed" landscape after rain), compensation for low atmospheric transmission $\tau_a$ (wet weather).

2—Compensation for an increase in the temperature of the camera.

3—A change in the image frequency F linked for example to the passage from a standby mode at low rate to a detection/identification mode at high rate ($D^*.F^{-\frac{1}{2}}$= constant).

4—A change in the field of view by variation of focal length, hence for a given input pupil, leading to a variation of aperture N: ($D^*N^2$=constant).

Figure 7:
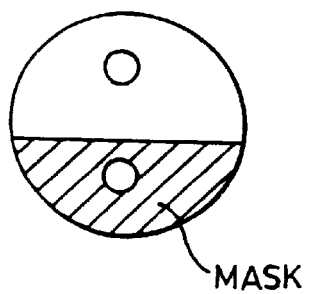
FIG. 7 shows a "cats eye" type filtering device.
Figure 7:
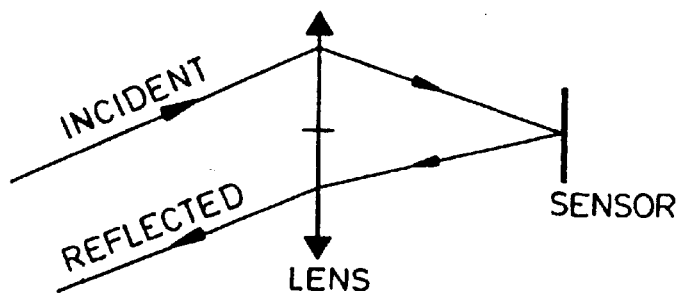

5—A compensation for a partial masking of the input pupil; this case is identical to the reduction of the cat's eye effect obtained for a semi-pupil mask (see FIG. 7): The beam reflected by cat's eye effect is in the direction of the incident beam. It emerges symmetrically to the center of the pupil: a semi-pupil mask is enough to stop it, thus increasing the discretion of the camera with respect to devices searching for laser-aimed optical systems: automatic mode (D*.So=constant).

6—Compensation for the lowering of transmission of the optical system ($\tau_o D^*$ at constant value).

7—Compensation due to a reduction of the infrared band $\Delta\lambda=\lambda_2-\lambda_1$, made necessary by a spectral analysis of the scene (decamouflaging, analysis/identification of pollutant/toxic gases $D^* \int_{\lambda_2}^{\lambda_1}.D\lambda$=const)

The compensations proposed may, if necessary, be associated with one another within the limits of the dynamic range of the function D*(T), and of the low temperatures that can be achieved and in the modes 4 to 7 requiring physical modifications (namely the positioning of the masks, filters, and the changing of focal length) to the optical system.

Figure 5:
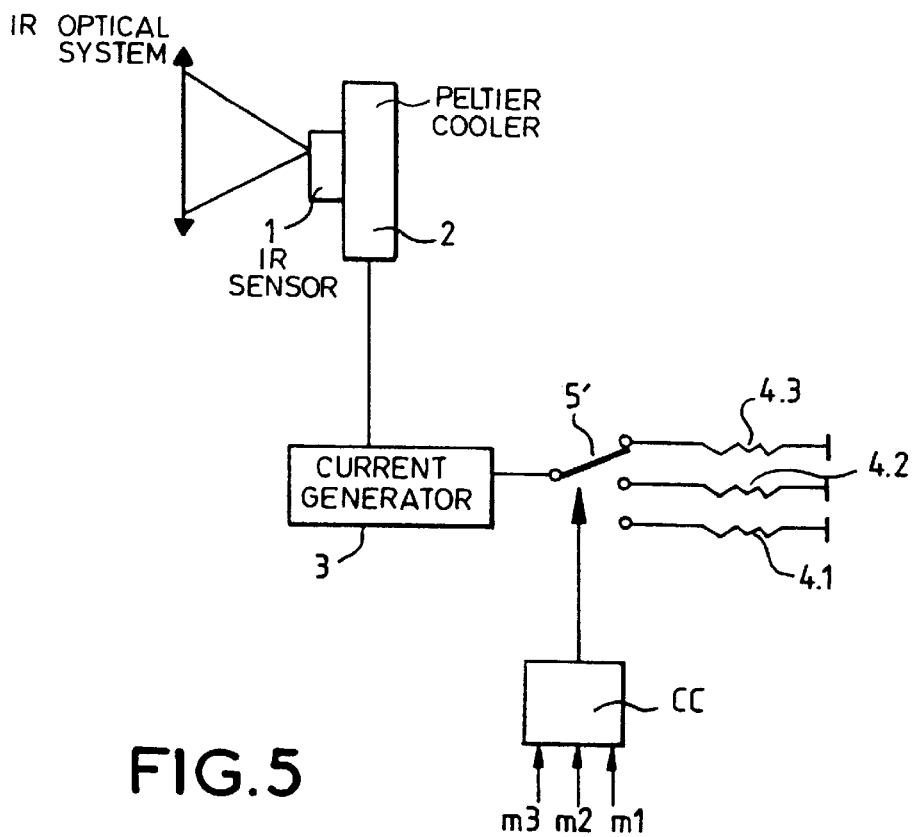
FIGS. 5 and 6 show an alternative embodiment of the control system of the cooler.

It is possible, as shown in FIG. 5, to provide for a control system 10 for the cooler which lays down particular cooling states identified in advance. Each state then corresponds then to one or more of the compensations listed here above. This system 10 may be switched over instead of the manual system and the automatic system or it may replace both these systems. This variant gives a more economical system. Indeed, the contrast analyzer does not come into play in this system and it is not necessary to provide for controlling the current of the Peltier cooler. This system may be made in a simplified way as shown in FIG. 5 by means of a selector switch 5' which connects the generator to a resistor 4.1 to 4.3 at choice. The choice of the resistor is made by a control circuit which, as a function of the parameters or conditions of operation m1–m3 of the camera, gives a control signal m1–m3 to the selector switch 5'.

Figure 6:
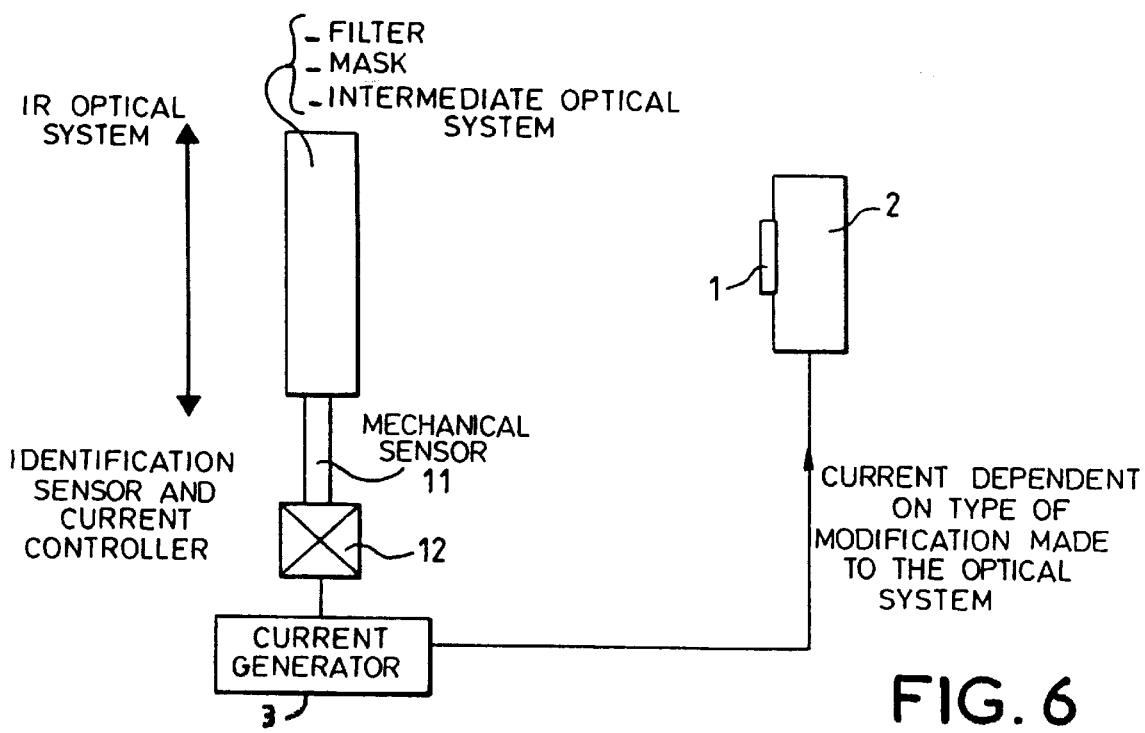

FIG. 6 provides for a mechanical sensor 11 which detects the presence of the filters and/or masks or measures the variation of the focal length. The sensor 11 is mechanically coupled to a current controller 12 which adjusts the current of the Peltier element to the predefined values to maintain a constant image contrast despite the modifications made in the optical system.

The cooler according to the invention may be a STIRLING type cold machine, for example with a working rate that is electrically controllable.

The invention can be applied to all IR imaging devices whose performance characteristics depend particularly on the temperature (low temperature quantum sensors): in the latter case, it is the rate of the cold machine that is controlled to obtain a variation in the temperature of the sensor.

What is claimed is:

1. An infrared imaging device comprising:
   a quantum device positioned and configured to detect infrared transmission at ambient temperature;
   a cooler thermally coupled to said quantum device; and
   controlling means for controlling the cooler based on a function of plural image-taking parameters as a command.

2. An infrared imaging device according to claim 1, wherein the quantum device has an active layer made of a material based on InAsSb.

3. An infrared imaging device according to claim 2, wherein the quantum device comprises a plurality of barrier layers; and the plurality of barrier layers of the quantum device are made of AlAsSb.

4. An infrared imaging device according to claim 1, wherein the cooler is a Peltier effect cooler.

5. An infrared imaging device according to claim 1, wherein the controlling means comprise a current generator and a manually controlled variable resistor connected in series with the current generator.

6. An infrared imaging device according to claim 1, wherein the controlling means comprise a current generator and a contrast analysis system configured to deliver a control signal as a function of detected contrast enabling the current generator to be controlled.

7. An infrared imaging device according to claim 1, wherein:

the controlling means comprises a current generator and at least one of a manually controlled variable resistor connected in series with the current generator and a contrast analysis system configured to deliver a control signal as a function of detected contrast enabling the current generator to be controlled; and the infrared imaging device further comprises a selector switch device configured to connect the current generator to one of the manually controlled variable resistor and the contrast analysis system.

8. An infrared imaging device according to one of the claims 1 or 4, wherein the controlling means determines a specified number of modes of operation of the cooler, each mode of operation enabling compensation for at least one image-taking parameter.

9. An infrared imaging device according to claim 1, further comprising an optical system having an aperture, wherein the function of plural image-taking parameters is at least one of a contrast of a scene viewed by the quantum device and the aperture of the optical system.

10. An infrared imaging device having a quantum device enabling detection at ambient temperature, the infrared imaging device comprising:

a quantum device positioned and configured to detect infrared transmission at ambient temperature;

a cooler thermally coupled to said quantum device; and a controller positioned and configured to control the cooler by receiving a function of plural image-taking parameters as a command.

11. An infrared imaging device according to claim 10, wherein the quantum device has an active layer made of a material based on InAsSb.

12. An imaging device according to claim 11, wherein:

the quantum device comprises a plurality of barrier layers; and the plurality of barrier layers of the quantum device are made of AlAsSb.

13. An imaging device according to claim 10, wherein the cooler is a Peltier effect cooler.

14. An imaging device according to claim 10, wherein the controller comprises a current generator and a manually controlled variable resistor connected in series with the current generator.

15. An infrared imaging device according to claim 10, wherein the controller comprises a current generator and a contrast analysis system configured to deliver a control signal as a function of detected contrast enabling the current generator to be controlled.

16. An infrared imaging device according to claim 10, wherein:

the controller comprises a current generator and at least one of a manually controlled variable resistor connected in series with the current generator and a contrast analysis system configured to deliver a control signal as a function of detected contrast enabling the current generator to be controlled; and the infrared imaging device further comprises a selector switch device configured to connect the current generator to one of the manually controlled variable resistor and the contrast analysis system.

17. An infrared imaging device according to claim 10, wherein the controller determines a specified number of modes of operation of the cooler, each mode of operation enabling compensation for at least one image-taking parameter.

18. An infrared imaging device according to claim 10, further comprising an optical system having an aperture, wherein the function of plural image-taking parameters is at least one of a contrast of a scene viewed by the quantum device and the aperture of the optical system.

* * * * *